United States Patent [19]

Brown

[11] Patent Number: 4,680,983

[45] Date of Patent: Jul. 21, 1987

[54] TRANSMISSION DIRECTION SELECTION SYSTEM

[75] Inventor: David J. Brown, Stockport, United Kingdom

[73] Assignee: Massey-Ferguson Services N.V., Curacao, Netherlands Antilles

[21] Appl. No.: 807,137

[22] Filed: Dec. 10, 1985

[51] Int. Cl.⁴ .................... B60K 20/00; B60K 20/10
[52] U.S. Cl. ............................... 74/474; 74/335; 192/3.58; 192/0.052
[58] Field of Search ............... 74/474, 335; 192/0.052, 192/0.07, 3.58, 3.63, 0.92

[56] References Cited

U.S. PATENT DOCUMENTS

| | | | |
|---|---|---|---|
| 3,789,688 | 2/1974 | Minks | 74/335 |
| 4,129,047 | 12/1978 | Dornan | 74/474 |
| 4,289,222 | 9/1981 | Esthimer | 192/3.58 |

FOREIGN PATENT DOCUMENTS 2334195  1/1975  Fed. Rep. of Germany ........ 74/474

*Primary Examiner*—Allan D. Herrmann
*Assistant Examiner*—Dirk Wright
*Attorney, Agent, or Firm*—Robert L. Farris

[57] ABSTRACT

A drive direction selection system for a vehicle transmission including a source of electrical power, a first circuit for supplying an electrical signal from the source to a forward drive direction engagement means and a second circuit for supplying an electrical signal from the source to a reverse drive direction engagement means. Forward and reverse drive direction selection pedals are provided which when depressed close forward and reverse direction selector switches in the first and second circuits respectively. First interlock means are arranged to break the first circuit on closing of the reverse direction selector switch and to maintain the first circuit broken until both switches are again simultaneously in their open condition. Second interlock means are arranged to break the second circuit on closing of the forward direction selector switch and to maintain the second circuit broken until both switches are again simultaneously in their open condition. The system thus offers protection against unexpected changes in drive direction of the vehicle. The system may also include a hand operated drive direction selection control enabling the vehicle operator to select the drive direction by operating the pedals or hand control as he chooses.

8 Claims, 1 Drawing Figure

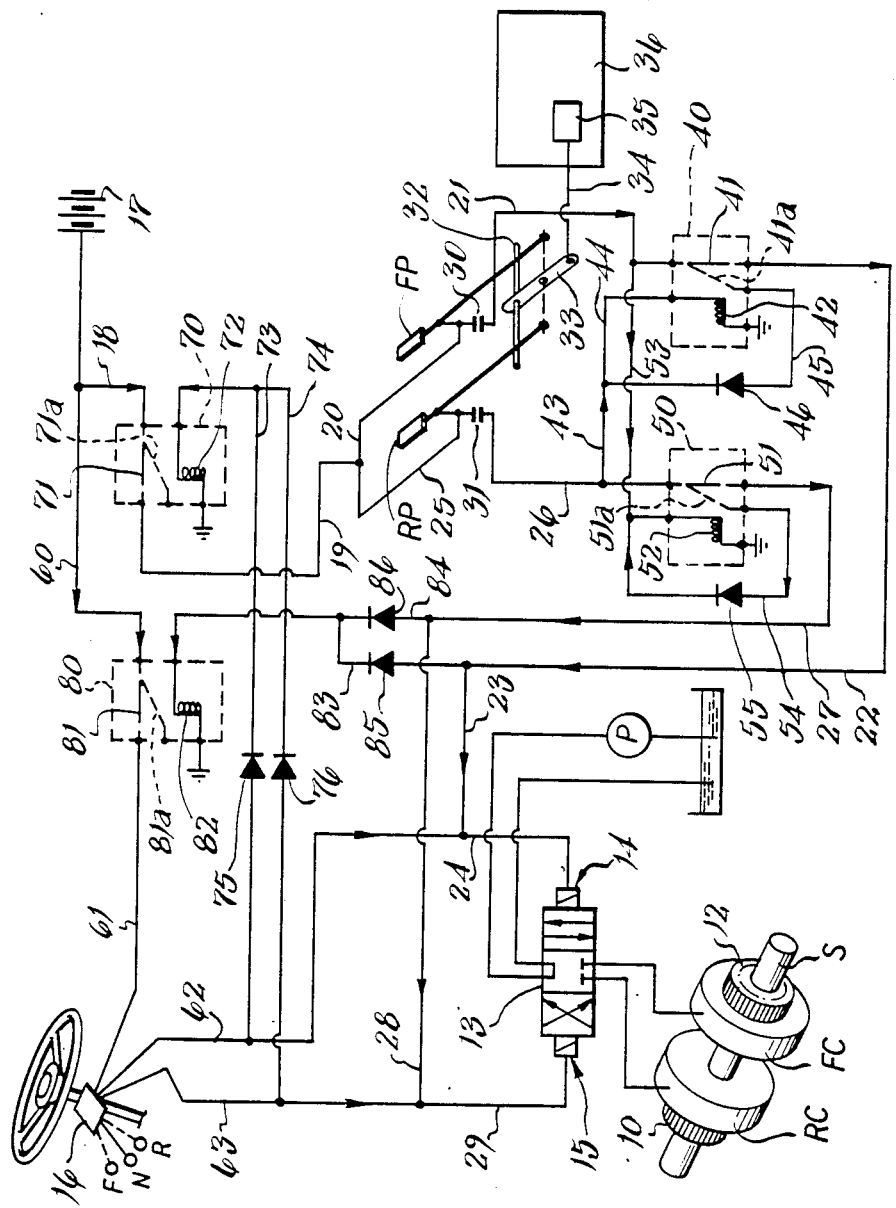

4,680,983

TRANSMISSION DIRECTION SELECTION SYSTEM

TECHNICAL FIELD

This invention relates to drive direction selection systems for vehicle transmissions, hereinafter referred to as being of the type specified, in which the drive direction of the transmission (i.e. the forward or reverse direction) is selected by the application of an electrical signal to either a forward direction engagement means or a reverse direction engagement means.

One example of a transmission of the type specified is a transmission for an industrial tractor in which the forward and reverse drive directions are engaged by hydraulically operated clutches whose hydraulic clutch engaging pressure is controlled by a solenoid-operated valve.

DISCLOSURE OF THE INVENTION

It is an object of the present invention to provide an improved form of drive direction selection system for a vehicle transmission of the type specified.

Thus according to the present invention there is provided a drive direction selection system for a vehicle transmission of the type specified, the selection system comprising a source of electrical power, a first circuit for supplying an electrical signal from the source to the forward drive direction engagement means, a second circuit for supplying an electrical signal from the source to the reverse drive direction engagement means, operator controlled forward and drive reverse direction selector switches in the first and second circuits respectively, said drive direction selector switches both being moveable between an open condition and a closed condition, first interlock means arranged on selection of the reverse drive direction by closing the reverse direction selector switch to break the first circuit and maintain the first circuit broken until both switches are again simultaneously in their open condition, and second interlock means arranged on selection of the forward drive direction by closing the forward direction selector switch to break the second circuit and maintain the second circuit broken until both switches are again simultaneously in their open condition.

The drive direction selection system of the present invention is primarily suitable for use with a transmission whose direction is controlled by a pair of pedals, one pedal for selection of the forward drive direction and the other pedal for selection of the reverse drive direction. When used with such a pedal arrangement the forward and reverse drive direction selector switches are operated by the forward and reverse pedals respectively. Such a two pedal arrangement is frequently arranged also to control the speed of the vehicle engine by arranging the first part of the travel of each pedal to select the drive direction of the transmission and the second part of the travel of each pedal to select engine speed with the further facility that if both pedals are simultaneously depressed through the first part of their travel the transmission remains in a neutral drive condition and the engine speed is determined by the extent of the depression of the pedals in the second part of their travel. This latter feature is particularly useful when the transmission is used in an industrial tractor fitted with a front-end loader and the operator has driven the loader into a pile of material which he wishes to raise and does not require to drive the vehicle but simply set the necessary engine speed to power the loader.

As will be appreciated the selection system of the present invention provides a particularly safe arrangement when used with such a pedal arrangement since it guards against sudden and unexpected movement of the vehicle which might otherwise arise if the operators foot is depressing both direction selection pedals to set the required engine speed only and then accidentally slips off one pedal so that only the other pedal is depressed. If this circumstance arises with a selection system in accordance with the present invention, the first and second circuits (which were both broken by the interlock means when both pedals were originally depressed) will remain broken until both pedals are released and both associated switches are therefore in their open condition.

In a preferred arrangement the first interlock means includes a first interlock switch in the first circuit, the first interlock switch having a first electrical actuating means connected with the second circuit and arranged to move the first interlock switch to an open condition on closing of the reverse direction selector switch, the first interlock switch when in its open position breaking the first circuit and completing an electrical connection to its own actuating means via the forward direction selector switch.

In a similar manner the second interlock means preferable includes a second interlock switch in the second circuit, the second interlock switch having a second electrical actuating means connected with the first circuit and arranged to move the second interlock switch to an open condition on closing of the forward direction selector switch, the second interlock switch when in its open position breaking the second circuit and completing an electrical connection to its own actuating means via the reverse direction selector switch.

Conveniently the first and second interlock switches and the associated first and second electrical actuating means are provided by first and second electrical relays respectively.

A selection system in accordance with the present invention in which the drive direction selection is made by two direction selection pedals as described above may be used in conjunction with a hand operated drive direction selection control having forward, reverse and neutral selection positions thus allowing the vehicle operator to select the drive direction of the vehicle by operating the pedals or the hand control as he chooses.

Such a combined system may include a third circuit for supplying an electrical signal to the forward drive direction engagement means when the vehicle operator moves the hand control to the forward direction selection position, a fourth circuit for supplying an electrical signal to the reverse drive direction engagement means when the vehicle operator moves the hand control to the reverse direction selection position, third interlock means arranged on movement of the hand control to its forward or reverse selection position to break the first and second circuits thereby disabling the direction selection pedals and a fourth interlock means arranged on operation of one or both direction selection pedals to break the third and fourth circuits thereby disabling the hand control.

Conveniently the third interlock means may comprise a third interlock switch for breaking the first and second circuits, the third interlock switch having a third electrical actuating means connected with the third and fourth circuits and arranged to move the third interlock switch to an open condition on, movement of the hand control to either its forward or reverse selection position and the fouth interlock means comprises a fourth interlock switch for breaking the third and fourth circuits, the fourth interlock switch having a fourth electrical actuating means connected with the third and fourth circuits and arranged to move the fourth interlock switch to an open condition on closing of one or both direction selection switches.

DESCRIPTION OF THE DRAWINGS

One embodiment of the present invention will now be described, by way of example only, with reference to the accompanying drawing which diagramatically illustrates a drive direction selection system for an industrial tractor in which the forward and reverse drive directions are engaged by hydraulically operated clutches whose hydraulic clutch engaging pressure is controlled by a solenoid-operated valve.

BEST MODE OF CARRYING OUT INVENTION

Referring to the drawing, the transmission of the industrial tractor includes a shaft S on which a reverse gear 10 and a forward gear 12 are mounted. A reverse drive direction engagement means in the form of an hydraulically operated reverse clutch RC is provided adjacent reverse gear 10 and a forward drive direction engagement means in the form of an hydraulically operated forward clutch FC is provided adjacent forward gear 12. The forward and reverse drive direction selection clutches RC and FC are operated by hydraulic pressure supplied from a pump P via a three-position solenoid-operated valve 13 whose solenoids 14 and 15 are actuated by a pair of direction selection pedals FP and RP or by a steering column mounted hand control 16 as will be described below.

Dealing first with the drive direction selection system associated with the pedals FP and RP this comprises a source of power in the form of a battery 17 which feeds a first circuit for selecting the forward drive direction and consisting of lines 18, 19, 20, 21, 22, 23, and 24 and a second circuit for selecting the reverse drive direction and consisting of lines 18,19,25, 26, 27,28 and 29. The first circuit includes a forward drive direction selector switch 30 which is closed when the forward pedal FP is depressed. Similarly the second circuit includes a reverse drive direction selector switch 31 which is closed when the reverse pedal RP is depressed.

Each direction selection pedal FP and RP is arranged so that the first part of its movement closes the associated switch 30 or 31 and the second part of its movement causes the pedal to contact a bar 32 mounted beneath the pedals on a lever 33. The lever 33 is connected by mechanical means such as a cable or rod system 34 (or by an electrical link) with an injector pump 35 of the engine of the tractor.

The first circuit includes a first interlock means in the form of a relay 40 having a first interlock switch 41 which is electrically actuated by a coil 42 which is connected via lines 43 and 44 with line 26 of the second circuit. When the switch 41 is moved to its open position 41a by the solenoid 42 the first circuit is broken and a self-energisation path for the solenoid 42 is opened up from the first circuit via a loop 45 which includes a blocking diode 46 to prevent reverse current flow.

In a similar manner the second circuit includes a second interlock means including a second relay 50 with a switch 51 which can be moved to an open position 52a by a solenoid 52 which is connected via line 53 with line 21 of the first circuit. When the switch 51 is moved to its open position a self-energisation path for the solenoid 52 is provided from the second circuit via loop 54 which includes a blocking diode 55 to prevent reverse current flow.

The drive direction selection system controlled by pedals FP and RP functions as follows.

If the tractor operator depresses the forward direction selection pedal FP the initial movement of this pedal closes switch 30 thus supplying power to the forward direction selection solenoid 14 from the battery 17 via the first circuit since the switch 41 is in its closed position. This supply of power to the solenoid 14 draws the spool of valve 13 to the right thus connecting the forward drive clutch FC to the hydraulic pressure provided by pump P thus engaging the clutch and connecting the forward drive gear 12 with the shaft S to give the forward drive direction in the tractor transmission.

Power is also supplied from the first circuit via line 53 to the coil 52 associated with the second switch 51 thus drawing the switch to its open position 51a thus breaking the second circuit and preventing the selection of the reverse drive direction.

As stated previously, after the forward direction selection pedal FP has been pressed sufficantly to close the switch 30 further depression of the pedal pivots the lever 33 to select the desired engine speed of the tractor via the linkage 34.

In a similar manner if the reverse direction selection pedal RP is depressed the switch 31 is closed thus supplying electrical power to the reverse direction selection solenoid 15 via the second switch 51. This draws the spool of valve 13 to the left thus connecting the hydraulic pressure to the reverse selection clutch RC thus coupling the gear 10 to the shaft S to give the reverse direction selection in the vehicle transmission. Power is also supplied via lines 43 and 44 to the coil 42 associated with switch 41 thus drawing the switch to its open position 41a thereby breaking the first circuit and preventing selection of the forward drive direction.

Should the vehicle operator press both direction selection pedals FP and RP down simultaneously this will result in both switches 30 and 31 being closed so that switch 51 is opened by an electrical signal to coil 52 via switch 30, line 21 and line 53 thus breaking the second circuit and switch 41 is opened by an electrical signal to coil 42 via switch 31, and lines 26, 43 and 44 thus breaking the first circuit. As stated previously switch 41 is maintained open via loop 45 and switch 51 is maintained open via loop 54. Thus both circuits are broken and neither of the direction selection solenoids 14 and 15 is operated so that the spool of valve 13 remains in its central neutral condition and no drive is provided in the associated vehicle transmission.

Thus with both pedals depressed simultaneously neither pedal is operative to select a drive direction of the vehicle and the pedals operated simply to select engine speed by contact with the bar 32 mounted on lever 33. As described previously this control mode is used, for example, by a tractor operator when using a front-end loader and enables the operator to direct all available engine power into the hydraulics to raise the loader.

It will be understood that the references above to both pedals being depressed simultaneously covers the situation in which the operator applies his foot to both pedals at the same time so that both pedals are depressed substantial at the same instant and also applies to a situation in which one pedal is initially depressed and the other pedal is subsequently also depressed whilst the first pedal remains depressed. The response time of the system is arranged so that if the operator applies his foot to both pedals at the same time any short duration signal to solenoid 14 or 15 resulting from switch 30 being opened fractionally before or after switch 31 is not effective to commence actuation of either the forward FC or reverse clutch RC.

If the operator has both pedals depressed and his foot slips off the forward selecton pedal FP thus opening switch 30, the switch 51 will continue to be held in its open position 51a by solenoid 52 which will be supplied with power via switch 31 and line 26, and loop 54 and the switch 41 will also continue to be held in its open position 41a by solenoid 42 which will be supplied with power via switch 31 and lines 26, 43 and 44. Thus, both circuits will be maintained in a broken condition and no drive direction selection will be possible until both pedals have been released.

In a similar manner, if both pedals are depressed and the operator's foot slips off the reverse selection pedal RP thus opening switch 31, the switch 41 will continue to be held in its open position 41a by the solenoid 42 which will be supplied with power via switch 30, line 21 and loop 45 and the switch 51 will also be held in its open position 51a by solenoid 52 which will be supplied with power via switch 30 and lines 21 and 53. Again, no drive direction selection can be made until both pedals have been released.

The drive direction selection system shown in the accompanying drawing also includes a steering column mounted hand control 16 with forward 'F', neutral 'N' and reverse 'R' direction selection positions.

Associated with the hand control 16 is a third circuit for selection of the forward drive direction comprising lines 60, 61, 62 and 24 and a fourth circuit for the selection of the reverse drive direction comprising lines 60, 61, 63 and 29.

A third interlock means in the form of a relay 70 having a switch 71 which when its open position 71a breaks the connection between lines 18 and 19 thus breaking the first and the second circuits and disabling the direction selection pedals FP and RP. The switch 71 is controlled by a coil 72 which is connected via lines 73 and 74 including blocking diodes 75 and 76 with the third and fourth circuits respectively. In a similar fashion a fourth interlock means in the form of a relay 80 is provided as a connection between lines 60 and 61. Relay 80 includes a switch 81 which when in its open position 81a breaks the power supply to the third and fourth circuit thus disabling the hand control 16. The switch 81 is moved to its open position by a coil 82 which can be energised from the first or second circuit via line 83 or 84. These lines include blocking diodes 85 and 86 respectively.

Thus if the vehicle operator moves the hand control 16 to the forward position F power is supplied to the solenoid 14 via lines 62 and 24 and the direction selection pedals FP and RP are disabled by the opening of switch 71 as a result of the energisation of coil 72 via line 73. Simarily if the operator moves the hand control 16 to the reverse position R the solenoid 15 is energised via lines 63 and 29 and switch 71 is again opened by energisation of coil 72 via line 74 thus again disabling the pedals FP and RP.

It will be asppreciated that if either of the direction selection pedals FP and RP is depressed to energise the corresponding solenoid 14 or 15 via switches 30 and 31 this also results in the opening of switch 81 following the energisation of coil 82 via line 83 or 84. Thus the hand control 16 is automatically disabled if the foot pedals are operated.

If desired the switches 71 and 81 can be made to maintain themselves in their open positions 71a and 81a respectively using self-energising circuit loops similar to the loops 45 and 54 described below with reference to switches 41 and 51 respectively. The effect of making switches 71 and 81 maintain themselves in their open positions in this manner would be that once the operator has opted to, for example control the vehicle by hand control 16 he cannot change to controlling the vehicle using pedals FP and RP until both the hand control and foot pedals are in their neutral and raised positions respectively.

I claim:

1. A drive direction selection system for a vehicle transmission, the selection system comprising a source of electrical power, a first circuit for supplying an electrical signal from the source to a forward drive direction engagement means, a second circuit for supplying an electrical signal from the source to a reverse drive direction engagement means, forward and reverse direction selector switches in the first and second circuits respectively controlled by forward and reverse direction selection pedals respectively, said drive direction selector switches both being movable between an open condition and a closed condition by moving the associated pedal between a raised and a depressed position respectively, first interlock means arranged to break the first circuit on depressing the reverse selection pedal to close reverse selector switch and to maintain the first circuit broken until both switches are again simultaneously in their open condition, and second interlock means arranged to break the second circuit on depressing the forward selection pedal to close the forward selector switch and to maintain the second circuit broken until both switches are again simultaneously in their open condition.

2. A system according to claim 1 in which the first interlock means includes a first interlock switch in the first circuit, the first interlock switch having a first electrical actuating means connected with the second circuit and arranged to move the first interlock switch to an open condition on closing of the reverse direction selector switch, the first interlock switch when in its open position breaking the first circuit and completing an electrical connection to its own actuating means via the forward direction selector switch.

3. A system according to claim 1 in which the second interlock means includes a second interlock switch in the second circuit, the second interlock switch having a second electrical actuating means connected with the first circuit and arranged to move the second interlock switch to an open condition on closing of the forward direction selector switch, the second interlock switch when in its open position breaking the second circuit and completing an electrical connection to its own actuating means via the reverse direction selector switch.

4. A system according to claim 2 or claim 3 in which the first and second interlock switches and the associated first and second electrical actuating means are provided by first and second electrical relays respectively.

5. A system according to claim 1 in which a hand operated drive direction selection control having forward, reverse and neutral selection positions is also provided to allow the operator to select the drive direction of the vehicle by using either the pedals or hand control.

6. A system according to claim 1 in which the third and fourth interlock switches and the associated third and fourth electrical actuating means are provided by third and fourth relays respectively.

7. A system according to claim 5 including a third circuit for supplying an electrical signal to the forward drive direction engagement means when the vehicle operator moves the hand control to the forward direction selection position, a fourth circuit for supplying an electrical signal to the reverse drive direction engagement means when the vehicle operator moves the hand control to the reverse direction selection position, third interlock means arranged on movement of the hand control to its forward ro reverse selection position to break the first and second circuits thereby disabling the direction selection pedals, and a fourth interlock means arranged on operation of one or both direction selection pedals to break the third and fourth circuits thereby disabling the hand control.

8. A system according to claim 7 in which the third interlock means comprises a third interlock switch for breaking the first and second circuits, the third interlock switch having a third electrical actuating means connected with the third and fourth circuits and arranged to move the third interlock switch to an open condition on movement of the hand control to either its forward or reverse selection position, and the fourth interlock means comprises a fourth interlock switch for breaking the third and fourth circuits, the fourth interlock switch having a fourth electrical actuating means connected with the first and second circuits and arranged to move the fourth interlock switch to an open condition on closing of one or both direction selection switches.

* * * * *